United States Patent [19]

Kirshnamurthy et al.

[11] Patent Number: 4,969,338
[45] Date of Patent: Nov. 13, 1990

[54] METHOD AND APPARATUS OF PRODUCING CARBON DIOXIDE IN HIGH YIELDS FROM LOW CONCENTRATION CARBON DIOXIDE FEEDS

[75] Inventors: Ramachandran Kirshnamurthy, Piscataway; Donald L. MacLean, Annandale, both of N.J.

[73] Assignee: The BOC Group, Inc., New Providence, N.J.

[21] Appl. No.: 500,333

[22] Filed: Mar. 28, 1990

Related U.S. Application Data

[62] Division of Ser. No. 396,584, Aug. 21, 1989.

[51] Int. Cl.$^5$ ............................................. F25D 17/02
[52] U.S. Cl. ................................... 62/373; 62/17; 62/64
[58] Field of Search ................. 62/17, 18, 63, 64, 373, 62/374, 380

[56] References Cited

U.S. PATENT DOCUMENTS

4,237,695  12/1980  Oberpiller et al. ................... 62/380
4,249,915   2/1981  Sircar et al. ............................ 62/18

Primary Examiner—Ronald C. Capossela
Attorney, Agent, or Firm—Carol A. Nemetz; Robert I. Pearlman

[57] ABSTRACT

A process for producing substantially pure liquid carbon dioxide from a carbon dioxide feed containing about 35 to about 98% by volume of carbon dioxide wherein a waste stream containing carbon dioxide is separated from contaminants in a pressure swing adsorption apparatus and then recycled to the carbon dioxide feed, and a system for recovering spent carbon dioxide from a refrigeration system using liquid carbon dioxide as a freezing agent.

6 Claims, 5 Drawing Sheets

METHOD AND APPARATUS OF PRODUCING CARBON DIOXIDE IN HIGH YIELDS FROM LOW CONCENTRATION CARBON DIOXIDE FEEDS

This is a division of application Ser. No. 07/396,584, filed 21 Aug. 1989.

FIELD OF THE INVENTION

This invention relates to the production of carbon dioxide of high recoveries from a feed containing a low concentration of carbon dioxide using a pressure swing adsorber.

BACKGROUND OF THE PRIOR ART

Carbon dioxide is conventionally obtained as a gaseous by-product from the production of ammonia or hydrogen as well as from fermentation plants. The by-product generally contains at least 98% carbon dioxide. It is known to convert the gaseous by-product into pure liquid carbon dioxide by distillation at recoveries exceeding 94% by weight.

Conventional distillation columns used for producing liquid carbon dioxide typically operate at about a pressure of 260 psia and a column condenser temperature of about $-25°F$. The waste gas removed from the top of the column as an overhead stream, under these conditions contains about 75% by volume of carbon dioxide. Accordingly, the amount of carbon dioxide lost as waste is about triple the amount of impurities in the feed. It therefore follows that carbon dioxide recovery decreases significantly as the concentration of carbon dioxide in the feed decreases.

Efforts at treating low concentration carbon dioxide feeds have focused on decreasing the carbon dioxide concentration in the column overhead This has been done by either increasing the column operating pressure or by decreasing the column condenser temperature. However, both of these methods suffer from significant disadvantages.

When the column pressure is increased, the solubility of inert impurities such as oxygen and nitrogen in the liquid carbon dioxide product increases.

In addition, the power needed for the refrigeration cycle increases and adds to the cost of the process. Further, at significantly higher pressures and in the presence of impurities such as oxygen, phase behavior limitations make it impossible to produce pure carbon dioxide by vapor-liquid separation.

Similarly, there are significant disadvantages in reducing the column condenser temperature. In conventional systems, much of the equipment including the distillation column is made of carbon steel. The lowest temperature which carbon steel can withstand is $-35°F$. Stainless steel such as Type 304 can be used at temperatures as low as $-50°F$., but at a significant increase in material cost.

By decreasing the temPerature of the column from $-35°F$. to $-50°F$., it is possible to increase the recovery of carbon dioxide from a given feed concentration. Similarly, it is possible to increase the carbon dioxide recovery at a given temperature if the pressure is increased. Nonetheless, the carbon dioxide recovery from these conventional systems is below 94% by weight if the concentration of the carbon dioxide feed is less than about 89% by volume.

Pressure swing adsorption has been used as an alternative to solvent absorption for separating carbon dioxide. For example, S. Sircar et al., U.S. Pat. No. 4,077,779 discloses a process for separating methane from carbon dioxide.

M. Duckett et al., U.S. Pat. No. 4,639,257 discloses a process for producing liquid carbon dioxide in which a membrane separator is used to separate gaseous carbon dioxide from components of a waste stream. The system is said to be useful to treat low concentration feed sources by compressing the feed gas to high pressures of at least 200 psia.

The membrane separation disclosed in Duckett et al. is limited to removing only those impurities which are significantly less permeable through the membrane than carbon dioxide, and are not suitable for the separation of carbon dioxide from impurities which are more permeable. Thus the membrane separation disclosed by Duckett et al. can not be used to separate hydrogen or helium from carbon dioxide. Since the membrane must also be highly selective for carbon dioxide, impurities such as oxygen, which are slightly less permeable than carbon dioxide, are not readily separated by membrane separation systems.

Further, dual compression is required when the membranes are first installed to separate the feed. Thus, in accordance with Duckett et al., the feed gas must be compressed before membrane separation and then the carbon dioxide-rich permeate must be recompressed prior to recycling to the distillation column. These requirements add significantly to the cost of the process and significantly limit its application.

SUMMARY OF THE INVENTION

The present invention provides a process for producing pure liquid carbon dioxide from low concentration carbon dioxide feeds, particularly feeds having a concentration of carbon dioxide of from about 35 to about 98% by volume. The recovery of carbon dioxide is enhanced by treating the waste stream from the distillation column in a pressure swing adsorption apparatus to thereby produce a highly concentrated carbon dioxide stream which is recycled to the carbon dioxide feed. The waste stream or the carbon dioxide stream obtained from the pressure swing adsorption apparatus may also be used for regenerating a dryer that is used to dry the carbon dioxide before it enters the distillation column.

In one embodiment of the invention the low concentration carbon dioxide stream is obtained as a vent gas from a liquid carbon dioxide-based refrigeration system used for freezing foods. The carbon dioxide stream is employed as feed gas to produce liquid carbon dioxide at high recoveries for recycle back to the food freezing system. The system provides a dedicated liquid carbon dioxide supply for the food freezer wherein the low carbon dioxide concentration vent gas from the food freezer is used as feed gas to produce liquid carbon dioxide.

BRIEF DESCRIPTION OF THE DRAWINGS

The following drawings in which like reference characters indicate like parts are illustrative of embodiments of the invention and are not intended to limit the scope of the invention as encomPassed by the claims forming part of the application.

DETAILED DESCRIPTION OF THE INVENTION

Figure 1:
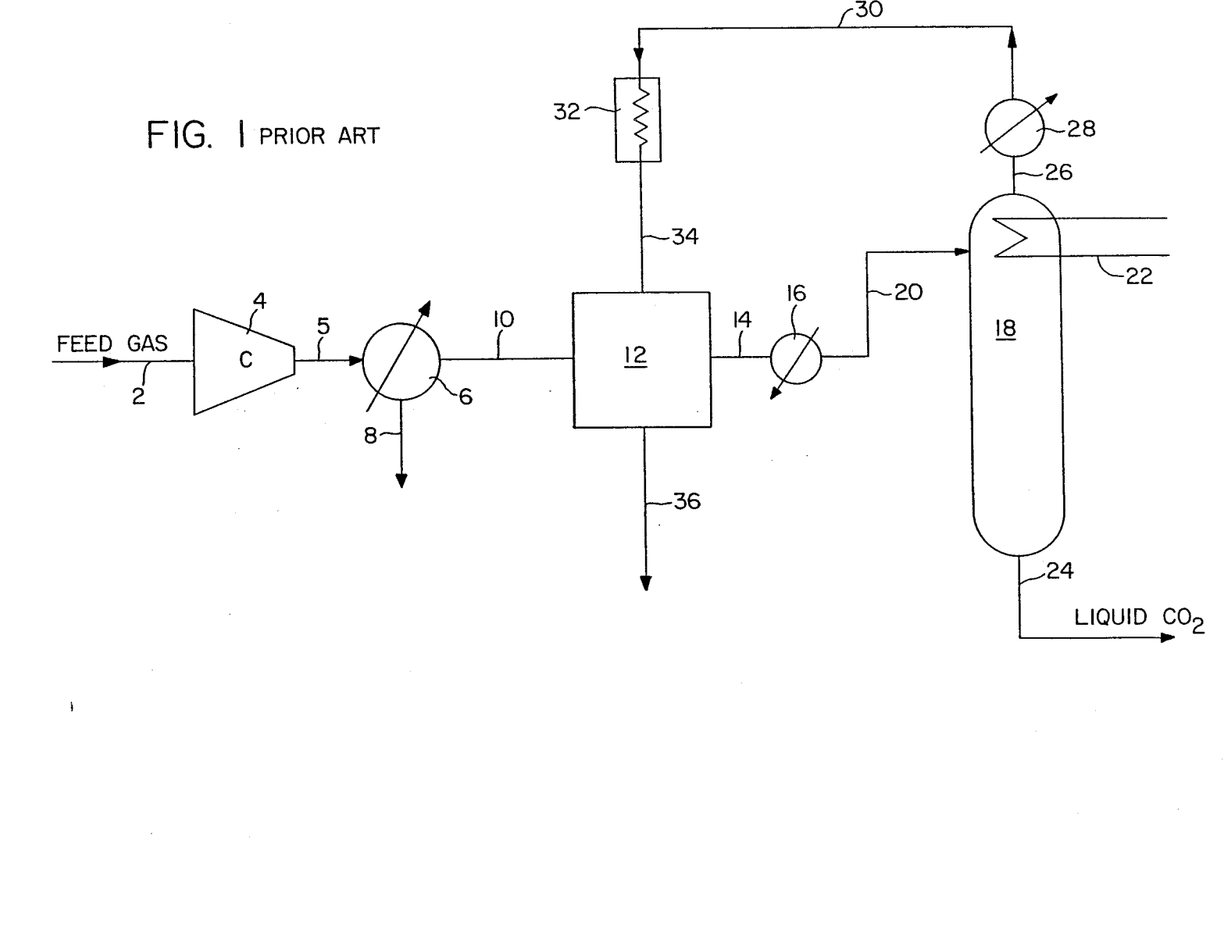
FIG. 1 is a schematic view of a conventional distillation system for converting gaseous carbon dioxide into substantially pure liquid carbon dioxide.

Referring to FIG. 1 there is shown a conventional distillation system for the production of liquid carbon dioxide from a gaseous stream containing carbon dioxide. Specifically, a feed gas is sent via line 2 to a multi-stage compressor 4 and then via line 5 to a cooler 6 where condensate water is removed via line 8. The cooled feed gas is sent via line 10 to a dryer 12. The feed gas is dried in the dryer 12 at least partially by heat supplied from the waste gas as explained hereinafter.

The dried feed proceeds via line 14 to a second cooler 16 and to a distillation column 18 via line 20. In the distillation column 18, a liquid reflux stream is produced by the refrigeration system 22. Substantially pure liquid carbon dioxide is removed from the bottom of the column 18 via line 24. A gaseous waste product containing a predominant amount of carbon dioxide and impurities such as nitrogen gas and is separated and removed as an overhead via line 26 to a heat exchanger 28 wherein the waste stream is heated and sent via line 30 to a heater 32.

It is common practice to integrate the heat-exchanger 28 and the feed cooler 16, so that all or part of the cooling energy required for cooling the feed is provided by the cold stream from the distillation column which requires warming. Thus, line 14 may be made to run in countercurrent relationship to line 26 within the heat exchanger 28 thereby eliminating the separate cooler 16.

The stream 34 exiting the heater 32 is heated to a temperature sufficient to regenerate the dryer 12 via line 34 so as to dry the cooled feed stream coming from the cooler 6 via line 10. Thereafter, the waste stream including all of the carbon dioxide contained therein is vented to the atmosphere via line 36. Because the waste stream contains a major portion of carbon dioxide, the conventional system of FIG. 1 is suited only for feeds containing a high carbon dioxide concentration.

Figure 2:
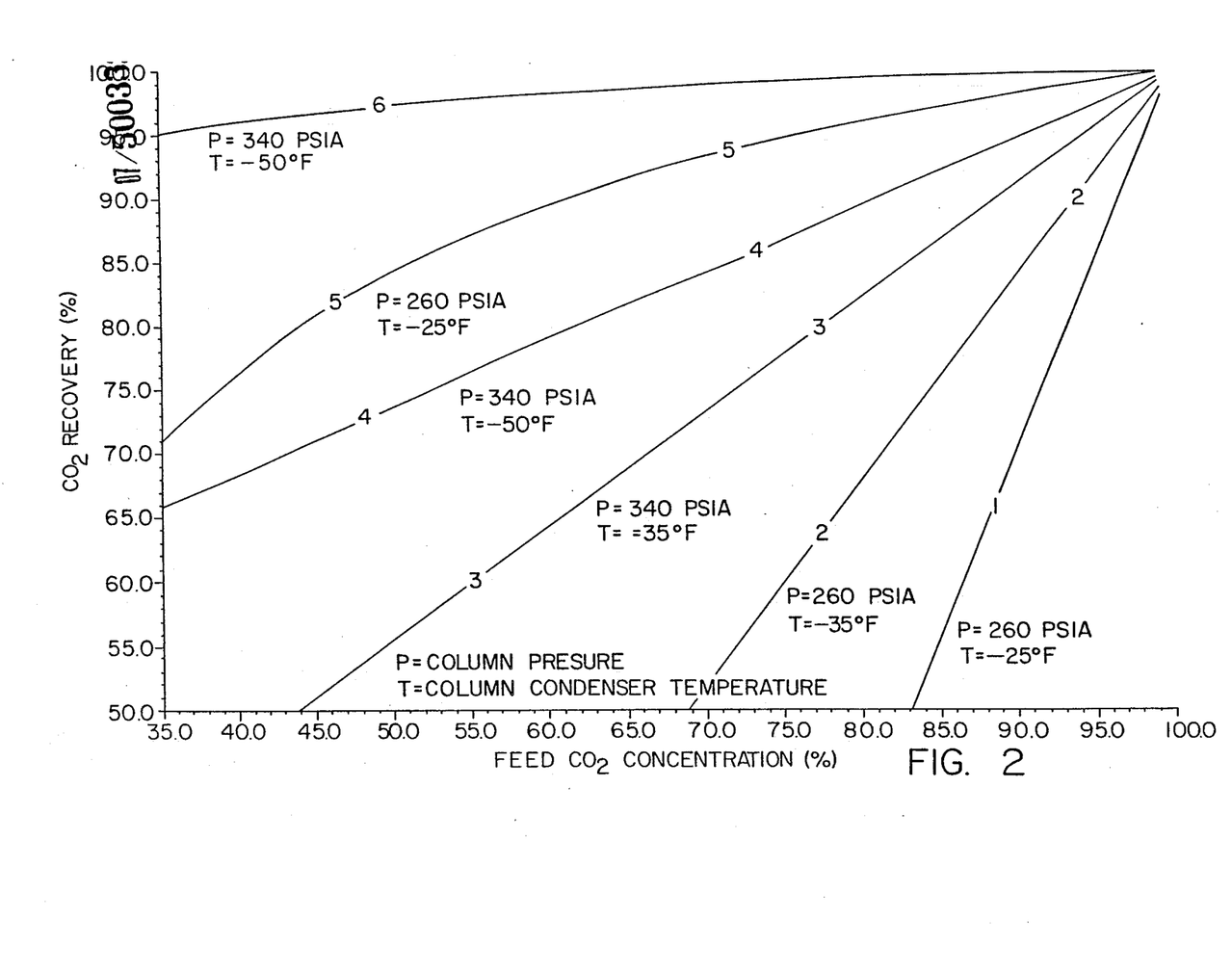
FIG. 2 is a graph plotting the recovery of carbon dioxide against the concentration of carbon dioxide in the feed for conventional systems and for the process in accordance with the present invention.

Referring to FIG. 2 there is shown a plot of carbon dioxide recovery versus carbon dioxide feed concentration under varying pressure and temperature conditions in the distillation column. It should be noted that all concentrations of the carbon dioxide in gas streams including the feed are expressed as a percent by volume and all carbon dioxide recoveries are expressed as a percent by weight of the ratio of liquid carbon dioxide produced to the carbon dioxide content in the feed gas. Plots 1 to 4 of FIG. 2 represent the recoveries obtained using the above-described conventional system. For example, by operating the column at 260 psia and a temperature of $-25°F$. (plot #1), it is possible to obtain a 94 weight recovery of carbon dioxide only when the feed concentration is about 98% by volume. Under the most rigorous conventional column conditions (e.g. a pressure of 340 psia; a temperature of $-50°F$.), a 94 weight % recovery of carbon dioxide can only be obtained when the feed concentration is at least 89% by volume. Thus, the conventional distillation system is useful only for high carbon dioxide concentration feed systems.

However, there is a need for carbon dioxide recovery systems where the carbon dioxide concentration is significantly less than 89% by volume and may be as low as about 35% by volume. In particular, commercial refrigeration units employing liquid carbon dioxide for freezing foods contaminate the liquid carbon dioxide with nitrogen and oxygen (air) to the extent that the spent carbon dioxide may contain as much as 50% or more of the contaminants. Typically this contaminated stream is vented to the atmosphere because recovery of the carbon dioxide is not economically feasible. This is because conventional systems, as previously described in connection with FIG. 2, sacrifice carbon dioxide recovery as the level of carbon dioxide in the feed decreases.

Further, even when the carbon dioxide concentration in the feed lies between 89% and 98% by volume, there is a definite need to obtain recoveries significantly exceeding 94% by weight when the availability of feed gas is limited compared to product liquid carbon dioxide requirements.

In accordance with the present invention, it is now possible to obtain high recoveries of carbon dioxide exceeding 94% by weight from feeds with low concentrations of carbon dioxide such as that obtained as a vent gas from conventional carbon dioxide food freezing refrigeration systems. More specifically, as shown in FIG. 3 there is disclosed a distillation system employing a pressure swing adsorber which can achieve at least 94% by weight carbon dioxide recovery from a feed having a low concentration of carbon dioxide and particularly a concentration of carbon dioxide in the range of about 35 to about 98% by volume.

Figure 3:
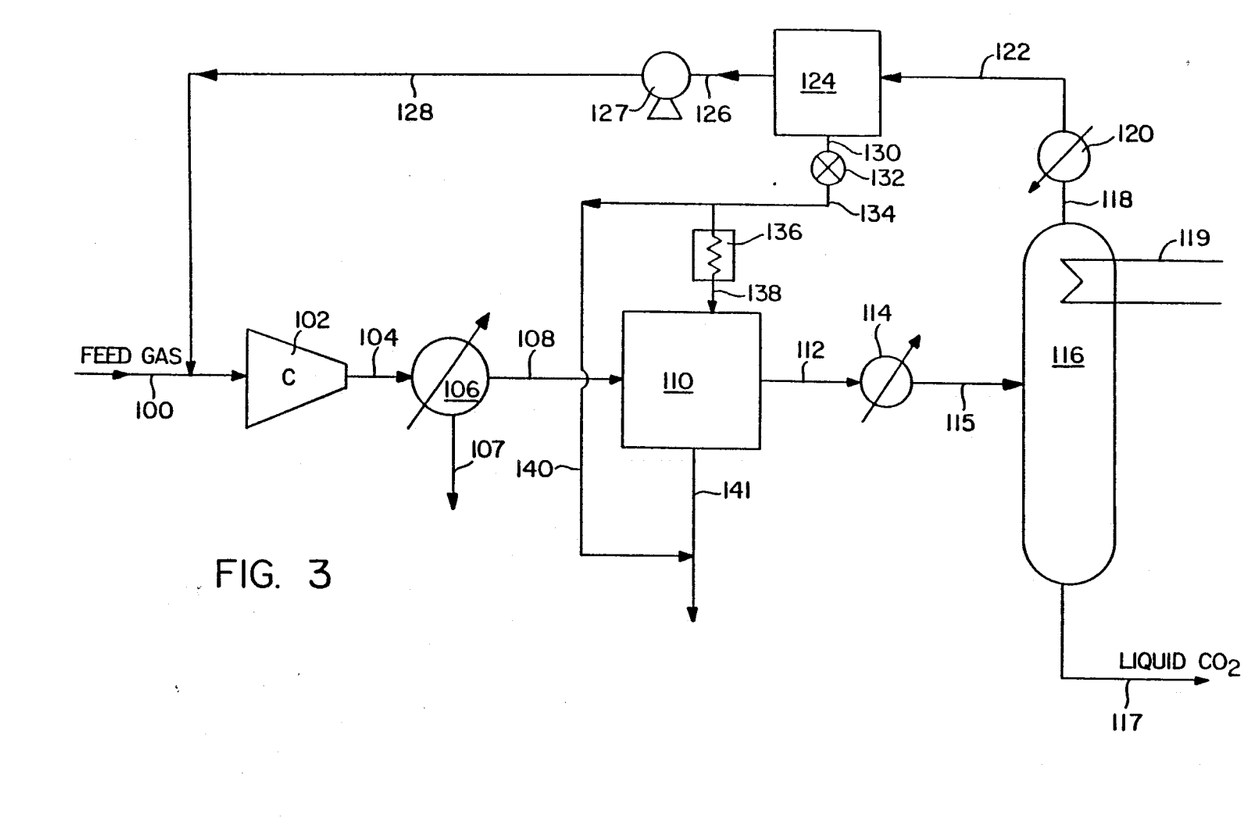
FIG. 3 is an embodiment of the present invention wherein at least a portion of the waste gas from a pressure swing adsorber is used to regenerate the dryer.

Further, for feed streams wherein the carbon dioxide concentration is between 89% and 98% by volume, it is possible to obtain liquid carbon dioxide recoveries exceeding 98% by weight using the system shown in FIG. 3.

As disclosed in FIG. 3, a feed gas is sent via a line 100 to a compressor 102 and via a line 104 to a cooler 106 where the stream is cooled and condensate water removed via the line 107. The gas is sent via line 108 to a dryer 110. Heat to the dryer 110 is at least partially supplied by all or part of a waste stream from a pressure swing adsorber apparatus as described hereinafter.

The dried feed stream flows via line 112 to a cooler 114 and the cooled stream flows into a distillation column 116 via the line 115, which column 116 houses a refrigeration unit 119 to obtain a liquid reflux, for separating the feed into a pure liquid carbon dioxide product and a waste stream containing a significant amount of carbon dioxide. The liquid carbon dioxide product is removed from the bottom of the distillation column 116 via a line 117.

The waste stream leaves the distillation column 116 via a line 118 where it is warmed from a column temperature of, for example, about $-35°F$. to about 90°F. in a heat exchanger 120. As described previously in connection with the conventional system of FIG. 1, the heat exchanger 120 and the cooler 114 can be integrated so that all or part of the cooling energy required for cooling the feed can be provided by the cold stream leaving the distillation column 116 which requires warming. The heated waste stream obtained from the heat exchanger 120 is sent via a line 122 to a pressure swing adsorber 124.

The pressure swing adsorber (PSA) 124 contains a molecular sieve or activated carbon adsorbent for separating carbon dioxide from the other gases in the waste stream. A typical example of the molecular sieve is zeolite 13X manufactured by Laporte Industries, Inc. PSA is a well-known apparatus for separating the components of a mixture of gases as a result of the difference in the degree of adsorption among them on a particulate adsorbent retained in a stationary bed. Typically, two or more such beds are operated in a cyclic process comprising adsorption under pressure and desorption under comparatively lower pressure or vacuum. The desired component or components of the gas mixture can be obtained during either of these stages. The cycle may contain other steps in addition to the fundamental steps of adsorption and regeneration, and it is commonplace where such a unit contains more than two adsorbent beds to have N beds cycled $(360/N)°$ out of phase, thereby providing a pseudo-continuous flow of desired product.

As shown in the embodiment of FIG. 3, the waste stream is divided in the PSA 124 into a carbon dioxide-enriched recycle stream which is sent via a line 126 to a vacuum pump 127, and a waste stream 130 containing a relatively small amount of carbon dioxide.

The carbon dioxide-rich stream is sent from the pump 127 via a line 128 to join the feed gas in line 100. The waste stream is released from the PSA 124 under pressure via a line 130 to a pressure reducing valve 132 where the pressure is reduced before the waste stream enters the dryer 110. All or a portion of the reduced pressure stream then passes through line 134 and enters a heater 136 where the stream is heated to provide regeneration for the dryer 110 via a line 138.

As shown specifically in FIG. 3, the amount of reduced pressure waste stream 134 used to regenerate the dryer 110 may be controlled by Providing a pathway for the flow of at least a portion of the waste stream outside of the dryer 110. Thus all or part of the waste stream can bypass the dryer 110 via a line 140 before being reunited with the waste stream leaving the dryer 110 via a line 141.

Figure 4:
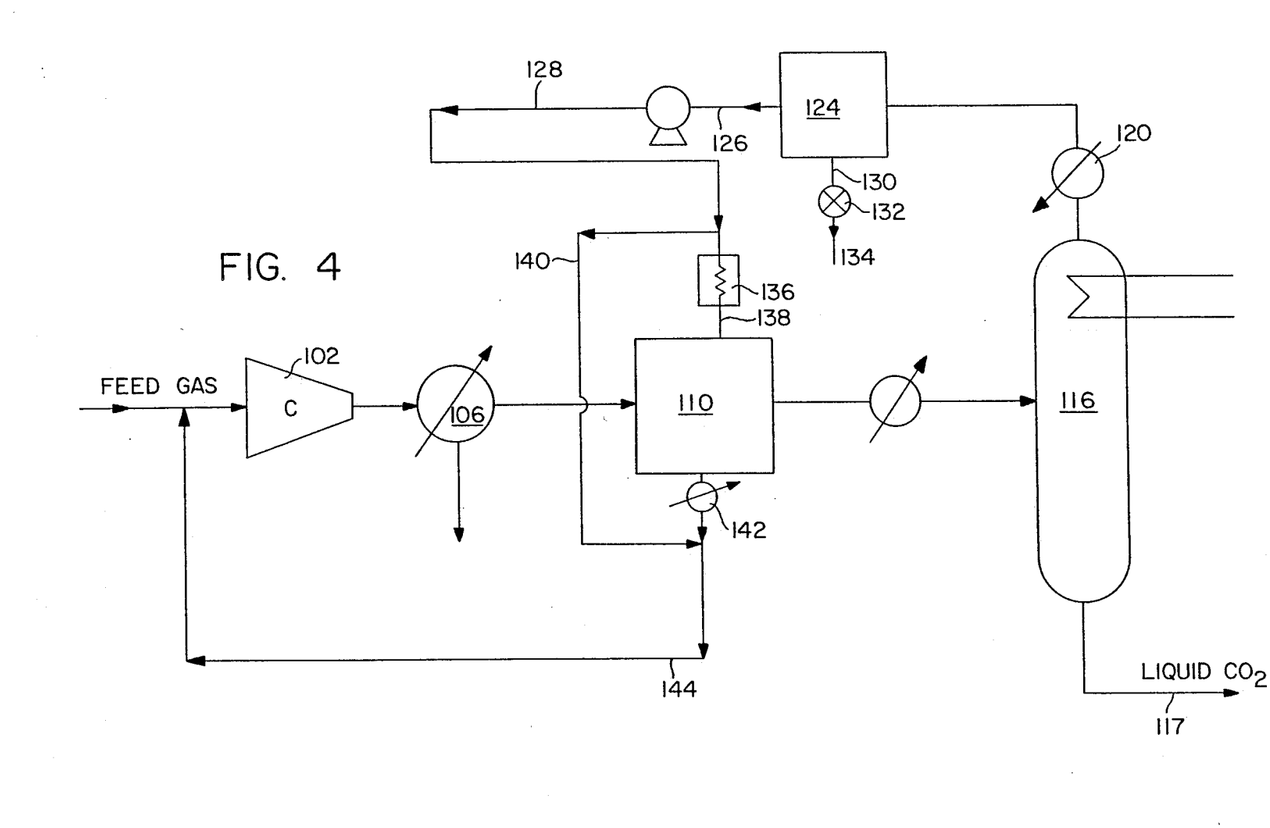
FIG. 4 is another embodiment of the present invention wherein at least a portion of the carbon dioxide-rich stream is used to regenerate the dryer.

In another embodiment of the invention as shown in FIG. 4, all or a portion of the carbon dioxide-enriched stream from the line 128 is sent to the dryer 110 for regeneration. More specifically, the carbon dioxide stream from the line 128 is sent to the heater 136 and via the line 138 to the dryer 110. Any bypass carbon dioxide is sent through the line 140. The carbon dioxide stream leaves the dryer 110 and is cooled in a cooler 142 before returning to the feed line 100 via the line 144. In the embodiment described in FIG. 4 the waste stream which leaves the PSA 124 via the line 130 passes through the pressure reducing valve 132 before being discharged from the system.

It will be readily understood from the embodiments shown in FIGS. 3 and 4 that the recycling of all or part of either the waste stream or the carbon dioxide-enriched stream for regenerating the dryer is a preferred feature of the invention.

As shown in FIG. 2, by plots 5 and 6, the process of the present invention can consistently exceed recoveries of 94% by weight of carbon dioxide for low concentration feeds containing as low as 35% carbon dioxide. As a result waste streams from highly contaminated carbon dioxide containing sources such as commercial food freezing systems using liquid carbon dioxide for freezing food can be treated to recover highly pure liquid carbon dioxide which can be recycled to the food freezer and thereby reduce the cost of commercial refrigeration.

The preferred embodiment of the process according to the present invention is to oPerate at high recoveries exceeding 94% by weight for any feed stream having a concentration of about 35% to about 98% by volume carbon dioxide. It should, however, be apparent to those skilled in the art that modifications can be easily made within the scope and spirit of the invention to operate at lower than 94% by weight carbon dioxide recoveries.

Figure 5:
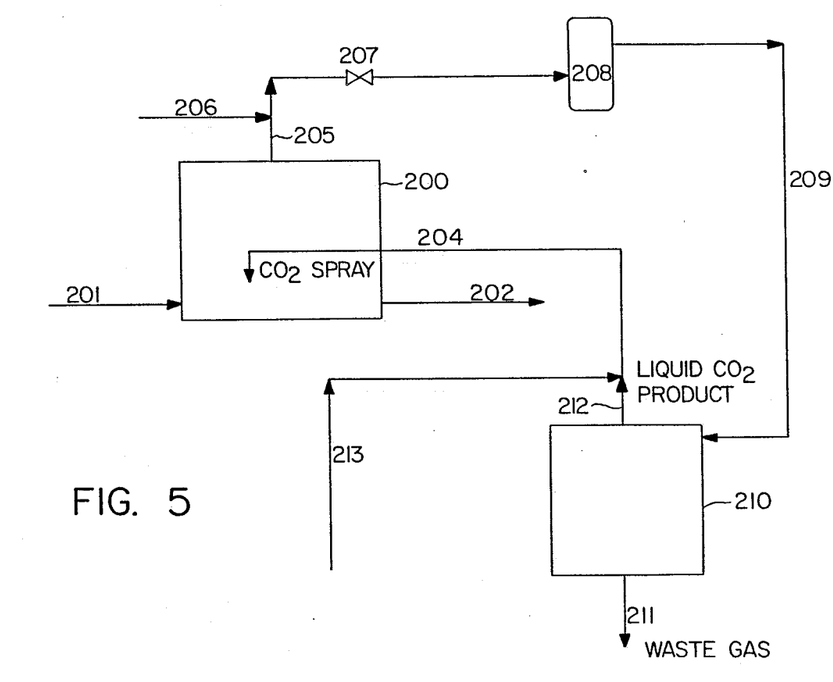
FIG. 5 is a schematic view of a system wherein the embodiment in FIG. 3 treats a vent gas from a food freezer, which uses liquid carbon dioxide to freeze food, to produce liquid carbon dioxide at high recoveries for supplying back to the food freezer.

The overall system for the application to food freezing of the process according to the present invention is shown in FIG. 5. Referring to FIG. 5, there is shown an overall system wherein an embodiment according to the present invention, which was described with reference to FIG. 3, is applied to recover liquid carbon dioxide from the vent gas of food freezers employing liquid carbon dioxide for food freezing.

Food such as meat, e.g. chicken, enters a food freezer 200 via a line 201 such as a conveyor belt. The food passes through the freezer 200 and is sprayed with liquid carbon dioxide entering the food freezer 200 via a line 204. The frozen food leaves the freezer via an outlet 202 for packaging. The carbon dioxide gas is exhausted from the freezer via a line 205 at regular time intervals when necessary in order to maintain the freezer at the desired temperature.

In commercial food freezer systems, air will leak into the food freezer 200 through the food inlet 201 and the food outlet 202 during normal operation, and whenever the freezer doors are open. The air is vented with the waste carbon dioxide via a line 205. To assist the evacuation of the air/carbon dioxide mixture from the freezer, pressurized air is sent into the line 205 via a line 206. The pressurized air may be generated by a fan or similar device. The pressurized air also serves to warm the air/carbon dioxide mixture in the line 205. The resulting vent gas is sent via the line 205 to a control valve 207 which is provided to maintain the flow of the vent gas to the carbon dioxide recovery system.

More specifically, the vent gas is sent to a gas holder 208 which serves to collect the vent gas and recovery system.

More specifically, the vent gas is sent to a gas holder 208 which serves to collect the vent gas and to provide a uniform recycle feed stream via a line 209. This feed stream enters the carbon dioxide recovery system previously described in connection with FIG. 3.

The liquid carbon dioxide obtained from the system via a line 212 is combined with make-up liquid carbon dioxide from a line 213 and sent to the freezer 200 via the line 204. The make-up liquid carbon dioxide is needed to compensate for the carbon dioxide losses resulting from leakage through the food inlet 201 and the foot outlet 202 of the freezer system and the carbon dioxide which may be lost in the recovery system.

COMPARATIVE EXAMPLE

In a conventional carbon dioxide generating system of the type described in FIG. 1, 223.0 lb mol/hr of a feed containing 85% carbon dioxide, 11.85% of nitrogen and 3.15% oxygen was employed as the carbon dioxide feed. The feed was transmitted at a temperature of 95°F. and a pressure of 15 psia to the compressor 4 where the pressure was increased to 270 psia and the temperature to 300°F. The compressed feed was cooled to 95°F. and the forwarded to a dryer where the water content was reduced from saturation to an amount giving a dew point of −80°F. The dried feed was then cooled to 0°F. and sent to the distillation column. Pure liquid carbon dioxide was obtained from the bottom of the column at a flow rate of 126.1 lb mol/hr.

A waste stream (96.9 lb mol/hr) containing 65.46% carbon dioxide, 27.28% nitrogen and 7.25% oxygen was discharged as an overhead from the column at a temperature of −35°F. and a pressure of 256.0 psia and sent to a heat exchanger for warming to 90°F. A portion of the waste stream (17.9 lb mol/hr) was then sent to a heater to raise the temperature to 300°F. to provide for the regeneration of the dryer. The remainder of waste stream (79.0 lb mol/hr) bypassed the heater and joined the other portion of the waste stream. The combined waste stream was vented to the atmosphere at the rate of 96.9 lb mol/hr. Almost two thirds of the discharged waste gas was carbon dioxide.

EXAMPLE 1

The same feed (85% carbon dioxide) at the same flow rate (223.0 lb mol/hr) and under the same conditions used in the comparative example was processed through the system of the present invention described in connection with FIG. 3. Because of the recycle of the carbon dioxide-enriched stream from the PSA to the original feed, the flow rate to the compressor was 284.8 lb mol/hr.

The feed entered the distillation column at the same temperature and pressure conditions as in the comparative example and produced pure liquid carbon dioxide at a flow rate of 186.0 lb mol/hr. The waste stream (98.9 lb mol/hr) containing the same composition as the comparative example was fed to the PSA to separate the carbon dioxide from the contaminants. The carbon dioxide-enriched stream leaving the PSA contained 98.9% carbon dioxide at a flow rate of 61.8 lb mol/hr which was recycled to the feed.

The waste stream leaving the PSA at the rate of 37.0 lb mol/hr contained only 8.82% carbon dioxide with the balance being nitrogen and oxygen. One portion of the stream (22.8 lb mol/hr) was used to regenerate the dryer While the balanCe (14.2 lb mol/hr) bypassed the dryer and combined with the other portion of the waste stream for venting.

EXAMPLE 2

A feed containing 93.0% carbon dioxide, 5.53% nitrogen and 1.47% oxygen at the same flow rate and under the same pressure and temperature conditions as in Example 1 was processed through the system of the present invention described in FIG. 4. Because of the recycle of the carbon dioxide-enriched stream from the PSA, the flow rate of the feed to the compressor was 252.0 lb mol/hr.

The flow rate of the liquid carbon dioxide leaving the distillation column was 205.9 lb mol/hr while a waste stream containing the same composition as described in Example 1 was fed to the PSA. The resulting carbon dioxide-enriched stream contained 98.9% carbon dioxide and was recycled at the rate of 29.0 lb mol/hr. A portion of this stream (20.2 lb mol/hr) was used to regenerate the dryer.

A waste stream discharged from the PSA at the rate of 17.1 lb mol/hr was reduced to a pressure of 140 psia. The waste stream contained 8.82% carbon dioxide.

It will be understood that the use of the carbon dioxide-enriched stream is desirable when the initial feed concentration of carbon dioxide is high (e.g. 93% by volume). This is because the waste stream discharged from the PSA is inadequate to regenerate the dryer.

EXAMPLE 3

In a carbon dioxide generating system of the type described in FIG. 3, 223.0 lb mol/hr of a feed containing 35% carbon dioxide, 51.35% of nitrogen and 13.65% oxygen was employed as the carbon dioxide feed. The feed was transmitted at a temPerature of 95°F. and a pressure of 15 psia to the compressor 102 where the Pressure was increased to 350 psia and the temperature to 300°F. Because of the recycle of the carbon dioxide-enriched stream from the PSA to the original feed, the flow rate to the compressor was 320.2 lb mol/hr. The compressed feed was cooled to 95°F. and then forwarded to a dryer where the water content was reduced from saturation to an amount giving a dew point of −80°F. The dried feed was then cooled to 0°F. and sent to the distillation column. Pure liquid carbon dioxide was obtained from the bottom of the column at a flow rate of 73.3 lb mol/hr.

A waste stream (247.0 lb mol/hr) containing 40.1% carbon dioxide, 47.3% nitrogen and 12.6% oxygen was discharged as an overhead from the column at a temperature of −50°F. and a pressure of 340.0 psia and sent to a heat exchanger for warming to 90°F. The waste stream was then fed to the PSA wherein the carbon dioxide was separated from the contaminants. The carbon dioxide-enriched stream leaving the PSA contained 97% carbon dioxide at a flow rate of 97.1 lb mol/hr which was recycled to the feed.

The waste stream leaving the PSA at the rate of 149.9 lb mol/hr contained only 3.3%carbon dioxide with the balance being nitrogen and oxygen. One portion of the stream (25.7 lb mol/hr) was used to regenerate the dryer while the balance (124.2 lb mol/hr) bypassed the dryer and combined with the other Portion of the waste stream for venting.

While particular embodiments of the invention have been described, it will be understood, of course, that the invention is not limited thereto since many obvious modifications can be made, and it is intended to include within this invention any such modification as will fall within the scope of the invention as defined by the appended claims.

What we claim is:

1. A system for freezing food with liquid carbon dioxide comprising:
   (a) freezing means adapted to freeze food with liquid carbon dioxide;
   (b) food inlet and outlet means for conveying non-frozen food to the freezer means and withdrawing frozen food from the freezer means;
   (c) means for removing a gaseous mixture containing from about 35 to about 98 percent by volume of carbon dioxide from the freezer means;
   (d) means for distilling the gaseous mixture to thereby form a liquid product containing substantially pure carbon dioxide and a first waste stream containing carbon dioxide;
   (e) pressure swing adsorption means adapted to separate the first waste into a carbon dioxide-enriched stream and a carbon dioxide-depleted second waste stream; and (f) means for recycling the carbon dioxide-enriched stream to said gaseous mixture obtained from the freezer means.

2. The system of claim 1 further comprising compressor means for compressing the gaseous mixture, drying means for drying the compressed gaseous mixture and cooling means for cooling the dried gaseous mixture.

3. The system of claim 2 further comprising means for forwarding at least a portion of the second waste stream to the drying means to Provide heat to the drying means.

4. The system of claim 2 further comprising means for forwarding at least a portion of the carbon dioxide-enriched stream to the drYing means to provide heat to the drying means and means for forwarding the carbon dioxide-enriched stream from the drying means to the gaseous mixture.

5. The system of claim 1 wherein the pressure swing adsorption means comPrises at least two beds, said beds containing a molecular sieve or activated carbon as an adsorbent.

6. The system of claim 5 wherein the molecular sieve is selected from a zeolitic material.

* * * * *